United States Patent [19]
Rode

[11] Patent Number: 6,004,040
[45] Date of Patent: Dec. 21, 1999

[54] BEARING ASSEMBLY ADJUSTMENT GAGING SYSTEM

[75] Inventor: John E. Rode, Fonda, N.Y.

[73] Assignee: Temper Corporation, Fonda, N.Y.

[21] Appl. No.: 09/130,166

[22] Filed: Aug. 6, 1998

[51] Int. Cl.$^6$ .......................... F16C 19/24; F16C 23/06; B67B 7/30

[52] U.S. Cl. ....................... 384/583; 384/551; 384/559; 29/437; 29/283.5

[58] Field of Search ..................... 384/551, 556, 384/559, 563, 571, 583, 626, 584; 29/437, 283.5, 445, 454

[56] References Cited

U.S. PATENT DOCUMENTS

| | | | |
|---|---|---|---|
| 3,689,126 | 9/1972 | Hayashi et al. | 384/559 |
| 4,492,018 | 1/1985 | Rode | 29/437 |
| 4,611,935 | 9/1986 | Rode | 384/563 X |
| 4,641,558 | 2/1987 | Hoffmann | 384/563 X |
| 5,549,397 | 8/1996 | Rode | 384/551 |
| 5,785,434 | 7/1998 | Rode | 384/551 |

*Primary Examiner*—Thomas R. Hannon
*Attorney, Agent, or Firm*—Heslin & Rothenberg, P.C.

[57] ABSTRACT

In one aspect, an adjustment system includes a first gage part adjustably engaged (e.g., mated and/or threaded) with a second gage part. The gage parts may be employed in a (e.g., pressing) process of direct installation of bearings (e.g., tapered roller bearings) on a final assembly spindle (e.g., a motor, pump and/or speed reducer shaft). Also, the gage part(s) may be employed in providing adjustment(s) (e.g., a preload and/or an endplay setting) for an adjustable spacer during the same process of direct installation of the bearings. The gage parts may have various interface(s) with the bearing(s), retainer(s), and/or housing portion(s), rotationally supported with respect to the spindle with the bearings. Further, the gage part(s) may serve to protect the bearing(s) from path(s) of compression employed in the adjustment(s). In another aspect, the gage part(s) may be employed in providing a desired adjustment for a gear mounted on the spindle. For the desired gear adjustment (e.g., an engagement, a clearance, and/or a backlash), gage part(s) may be employed to provide a desired relation between the gear and another gear (e.g., a worm and/or a bevel gear).

22 Claims, 4 Drawing Sheets

6,004,040

BEARING ASSEMBLY ADJUSTMENT GAGING SYSTEM

TECHNICAL FIELD

This invention relates, generally, to the field of spindle mounted bearings and, more particularly, to gaging adjustment to an adjustable spacer associated with such bearings mounted on a spindle or the like, as well as gaging adjustment for a gear mounted on such a spindle.

BACKGROUND ART

Anti-friction bearings serve to decrease friction between, for example, a stator and a rotor. For instance, such bearings may allow relative rotation between the housing and a shaft, spindle or axle extending therethrough. The bearings may comprise roller bearings, for example, tapered roller bearings. In one example, the tapered roller bearings may be employed in wheel hub and axle assemblies. In another example, the tapered roller bearings may be employed in devices such as motors, pumps, or speed reducers.

A typical tapered roller bearing includes a cone having an inner race for mounting on a spindle, a cup having an outer race for mounting in a housing, and a plurality of roller elements within a roller cage positioned between the inner and outer races. Commonly, a pair of such tapered roller bearings are mounted on a shaft for rotation relative to or within a housing. Cooperating bearings, such as a pair of tapered roller bearings, may be included in a bearing assembly, of a motor, pump, speed reducer or transmission assembly.

In order to properly secure bearings in motor, pump, speed reducer, and/or transmission assemblies, it is necessary to retain the bearings tightly under a pre-determined axial tolerance or load on the shaft or axle, so that they will maintain the proper running clearance of the roller elements under the influence of the combined axial and radial forces which they are designed to support. It is often the practice of manufacturers of such assemblies to carefully measure the space between the bearing inner races, and provide a spacer of precisely the correct dimension and load requirements to fit therebetween. The spacer is often made of ground steel tubing to a length tolerance of plus or minus one half of one thousandths of an inch. If the bearings are not maintained at a proper tolerance and/or load the bearings may not roll properly or may prematurely wear, particularly if the bearings are maintained at too high of a load, or may, if maintained under too low of a load, have excessive play causing failure of the bearings.

Certain assemblies including pumps, motors, reducer shafts, bevel gear or worm gear transmission, and other types of transmissions may employ an adjustable spacer or load ring which is typically fitted by means of loading without the assembly. The adjustable spacer may then be mounted, after it has been crushed to a preselected distance, on the bearing assembly. In assemblies which are subject to high loading during service, it may be required that the spacer have a very high capacity to resist being deformed. It may also be desirable to crush or size the adjustable spacer while mounted or on, a partially or fully assembled bearing assembly. In such situations the spacers are typically crushed on the assemblies but the axial load is transmitted through the spacer onto the bearings.

Thus, a need exists for improving ease, accuracy, performance and control of adjustment to an adjustable spacer employed with a bearing assembly of, for example, a pump, motor, or transmission. A need also exists for decreasing dimensional measurements required to properly prepare a spacer and bearing assembly. An additional need exists for a configuration allowing adjustment to an adjustable spacer of a partially or fully assembled bearing assembly of a pump, motor or transmission. A further need exists for providing such adjustment without transmitting the axial load through the bearings prior to final assembly.

SUMMARY OF THE INVENTION

Pursuant to the present invention, shortcomings of the existing art are overcome and additional advantages are provided through the provision of a bearing assembly adjustment gaging system.

In one aspect of the invention, an adjustable bearing adjustment system includes a first gage part and a second gage part. The first gage part includes first and second gage portions. The first gage portion of the first gage part is formed to abut a bearing rotatably connected with a spindle. The second gage portion of the first gage part is formed to abut an adjustable spacer. The adjustable spacer is located between the second gage portion of the first gage part and a retainer. The second gage part is located between the retainer and a housing. The second gage part is adjustably engageable with the first gage part. The second gage part is configured to provide a selected limit of travel during a compression of the spacer between the second gage portion of the first gage part and the retainer to provide a desired adjustment to the spacer.

In another aspect of the invention, the desired adjustment can comprise a preload and/or an endplay setting. The second gage part can include an axial dimension sized to provide the selected limit of travel for the adjustment to the spacer.

The first gage portion of the first gage part can abut the bearing. The second gage portion of the first gage part can abut the spacer. The spacer can abut the retainer. The second gage part can be adjustably engaged with the first gage part. The second gage part can abut the housing.

The spindle can comprise a final assembly spindle. The retainer can comprise a final assembly retainer.

The spindle can comprise a motor shaft portion, a pump shaft portion, and/or a speed reducer shaft portion.

The bearing can comprise a first bearing. The retainer can comprise a first retainer. The housing can abut a second retainer. The second retainer can abut a second bearing rotatably connected with the spindle.

The first and second gage parts can include mating screw threads. An engagement of the second gage part with the first gage part can protect the bearing from a path of action of the compression.

The bearing can comprise a first bearing. The spacer can comprise a first spacer. The selected limit of travel can comprise a first limit of travel. The compression can comprise a first compression. The retainer can comprise a first retainer. There can be a third gage part and a fourth gage part. The third gage part can include third and fourth gage portions. The third gage portion of the third gage part can be formed to abut a second bearing rotatably connected with the spindle. The fourth gage portion of the third gage part can be formed to abut a second spacer. The fourth gage part can be adjustably engageable with the third gage part. The fourth gage part can serve to provide a second limit of travel during a second compression of the second spacer between the fourth gage portion of the third gage part and a second retainer to provide a desired adjustment to the second spacer.

The first compression and the second compression can be substantially concurrent.

A first gear can be mounted on the spindle. A selected movement of the first gage part and/or the third gage part can serve to provide a desired relational adjustment between the first gear and a second gear. The second gear can resemble a bevel gear and/or a worm. The desired relational adjustment can comprise an engagement, a clearance, and/or a backlash.

An engagement of the fourth gage part with the third gage part can protect the first bearing and/or the second bearing from a path of action of the second compression.

In yet another aspect of the present invention, an adjustable bearing adjustment system includes a first gage part and a second gage part. The first gage part includes first and second gage portions. The first gage portion of the first gage part is formed to abut a first bearing portion of a bearing rotatably connected with a spindle. The second gage portion of the first gage part is formed to abut a second bearing portion of the bearing. The second bearing portion of the bearing is located between the second gage portion of the first gage part and a retainer. The second gage part is located between the retainer and a housing. The second gage part is adjustably engageable with the first gage part. The second gage part serves to provide a selected limit of travel during a compression of an adjustable spacer between the second bearing portion of the bearing and the retainer to provide a desired adjustment to the spacer.

An engagement of the second gage part with the first gage part can protect the first bearing portion of the bearing from a path of action of the compression.

The invention further contemplates an adjustable bearing adjustment method. A first gage part is located between a bearing portion and an adjustable spacer. The adjustable spacer is located between the first gage part and a retainer. The bearing portion is rotatably connected with a spindle. A second gage part is adjustably engaged with the first gage part. The second gage part is located between the retainer and a housing. The second gage part is employed to provide a selected limit of travel during a compression of the spacer between the first gage part and the retainer to provide a desired adjustment to the spacer.

An engagement of the second gage part with the first gage part can be employed to protect the bearing portion from a path of action of the compression.

The bearing portion can comprise a first bearing portion of a bearing. A second bearing portion of the bearing can be located between the first gage part and the spacer. The compression can be applied to the spacer between the second bearing portion and the retainer to provide the desired adjustment.

A first gear can be mounted on the spindle. The first gage part can be moved to provide a desired relational adjustment between the first gear and a second gear.

Thus, the present invention advantageously provides improved ease, accuracy, performance and control of adjustment to an adjustable spacer employed with a bearing assembly. Further, the present invention decreases requirements for dimensional measurements to properly prepare a spacer for a bearing assembly. Also, the invention allows an adjustment to be made to a gear mounted on a spindle as part of a process of installing a bearing assembly on the spindle and providing an adjustment to a spacer.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be readily understood from the following detailed description of preferred embodiments taken in conjunction with the accompanying drawings in which:

BEST MODE FOR CARRYING OUT THE INVENTION

In accordance with the principles of the present invention, a bearing assembly adjustment gaging system is provided.

Examples of formation and positioning of adjustable spacer(s) and gage parts for a bearing assembly located between a spindle and a housing incorporating and using the novel features of the present invention, are depicted in the Figures and described in detail herein. As used herein, the term "spindle" refers to a central member which rotates within a bearing portion, and is intended to include axles, shafts and the like.

Figure 1:
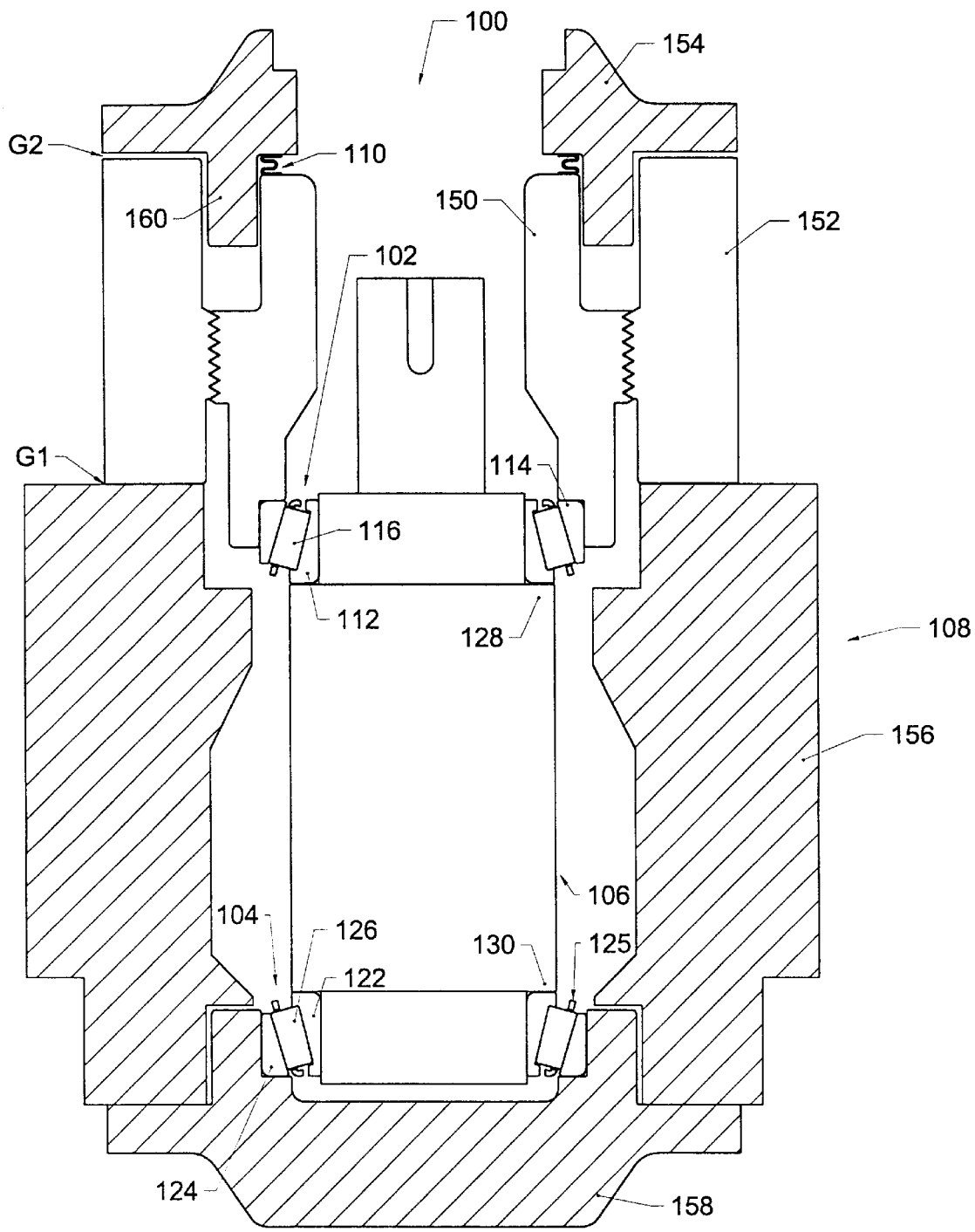
FIG. 1 is a cutaway, sectional, partial, side view of one example of exemplary formation and positioning of an adjustable spacer and gage parts for a bearing assembly located between a shaft and a housing, in accordance with the principles of the present invention.

In an exemplary embodiment depicted in FIG. 1, bearing assembly 100 includes first bearing 102 and second bearing 104. For illustrative purposes, FIG. 1 depicts the bearings mounted on shaft 106. For instance, such a shaft may comprise a pump, motor, or reducer speed shaft. The bearings may include, for example, a pair of identical but opposed tapered roller bearings, as depicted in FIG. 1. In addition, one or more of the bearings may comprise an unsealed or a sealed bearing, as will be appreciated by those skilled in the art.

Referring to FIG. 1, bearings 102 and 104 support, for instance, a housing 108. First gage part 150 and second gage part 152 may be employed in providing a desired adjustment to adjustable spacer 110. For example, the desired adjustment to the adjustable spacer may include a preload and/or an endplay setting for the bearing(s) 102 and/or 104, as will be appreciated by those skilled in the art. In accordance with the principles of the present invention, the spacer may be adjusted in a partially or fully assembled bearing assembly 100, for example, of a pump, motor, or transmission.

A description of adjustable spacer 110 is presented herein, with further details provided in commonly owned U.S. Pat. No. 5,549,397 to Rode (entitled "Adapter Sleeve and an Adjustable Spacer with Radial Extension Useable Thereon" and issued Aug. 27, 1996), in commonly owned U.S. application Ser. No. 08/661,349 of Rode (entitled "Adjustable Bearing Assembly and Adapter Sleeve Therefor" and filed Jun. 14, 1996), in commonly owned U.S. application Ser. No. 09/058,059 of Rode (entitled "Bearing Assembly Adjustable Spacer and System for Adjusting the Same" and filed Apr. 9, 1998) and in commonly owned U.S. application Ser. No. 09/108,514 of Rode (entitled "Bearing Assembly Adjustable Spacer and System for Adjusting the Same" and filed Jul. 1, 1998), which are hereby incorporated herein by reference in their entireties.

In one previous approach, the spacer would be adjusted according to dimensional measurements. Such an approach suffers shortcomings of being time-consuming and allowing errors to be introduced by the assembler. In an exemplary approach disclosed in the above-incorporated U.S. applications Ser. Nos. 09/058,059 and 09/108,514, in one aspect, a spacer may be adjusted separately from a final assembly spindle in conjunction with the final assembly bearings. The adjustment to the spacer may temporarily employ gaging extensions for the bearing cups and cones. However, it remains desirable to allow gaging adjustment to be made to the spacer as a part of direct installation of a bearing assembly on a final assembly spindle.

Referring again to FIG. 1, bearing 102 may comprise a tapered roller bearing which includes inner race 112 mounted on shaft 106, outer race 114 mounted in housing 108, and roller elements 116 positioned between the inner and outer races. Similarly, bearing 104 may comprise a tapered roller bearing which includes inner race 122 mounted on the shaft, outer race 124 mounted in the housing, and roller elements 126 positioned between the inner race 122 and the outer race 124. One or more of the bearings may employ roller cage(s) 125 in order to hold the roller elements 116, 126 in proper position between the corresponding inner and outer races, as will be understood by those skilled in the art.

Still referring to FIG. 1, shaft 106 may include shoulder 128 for receiving inner race 112 of bearing 102. Furthermore, the shaft may include shoulder 130 for receiving inner race 122 of bearing 104.

In one example, again referring to FIG. 1, housing 108 may be mounted about outer races 114 and 124 for rotation about shaft 106, with roller elements 116 positioned between the outer race 114 and inner race 112, and roller elements 126 positioned between the outer race 124 and inner race 122, where the inner races may be mounted on the shaft. In another example, the shaft may rotate within the housing, in accordance with the principles of the present invention. That is, the shaft and/or the housing may serve as, and/or resemble, a stator and/or a rotor, as will be appreciated by those skilled in the art. For purposes of illustration, the description herein emphasizes applications of the invention particularly suitable for devices such as motors, pumps, and speed reducers.

Further referring to FIG. 1, gage part 150 may be located between outer race 114 of bearing 102 and adjustable spacer 110. The adjustable spacer may be located between the gage part 150 and first retainer 154. The gage part 150 may be adjustably engaged with gage part 152. For instance, the gage parts may be formed with mating screw threads. Housing 108 may include medial member 156 located between the gage part 152 and second retainer 158. The retainer 158 may abut outer race 124 of bearing 104.

While part(s) of the description herein, for explanatory purposes, may imply certain exemplary direction(s), such direction(s) may be considered relative. As will be appreciated by those skilled in the art, the significance of, for example, a "vertically upward" direction in many environments stems from its opposition to a dominant "downwardly" acting gravitational force, resulting from the presence of a large mass such as the Earth, where "vertical" approximates radial alignment therewith. Furthermore a "horizontal" direction and a "vertically upward" direction can be readily ascertained following determination of an appropriate "downward" direction. Design choice(s) allow accommodation(s) of any orientation(s) for any system(s) in accordance with the principles of the present invention.

An exemplary operation with respect to illustrative positioning and formation of various components, is now presented with reference to FIG. 1. In one example, retainer 158 receives outer race 124 of bearing 104. The bearing 104 is assembled and supported atop its outer race 124. Shaft 106 may be received by inner race 122 of the bearing 104. Medial member 156 may be supported about the shaft through receipt on and/or by the retainer 158. Inner race 112 of bearing 102 may be received on and/or by the shaft. The bearing 102 may be assembled and supported atop its inner race 112. Gage part 150 may be received on and/or by the outer race 114 of the bearing 102.

In one aspect, axial as well as radial support may be provided among various components. For instance, retainer 158 may provide axial support for outer race 124 of bearing 104, while also providing radial support thereto, such as for positioning thereof. Shaft 106 and inner race 122 of the bearing 104, for example, may have surfaces which abut axially and radially. Similarly, inner race 112 of bearing 102 and the shaft may have surfaces which abut axially as well as radially. Furthermore, gage 150 may be formed to abut outer race 114 of the bearing 102 along axial as well as radial surfaces. Retainer 154 and adjustable spacer 100 may include surfaces for axial and radial support therebetween. Medial member 156 and the retainer 158 may include surfaces which abut along axial and radial directions. Such formation and/or positioning may allow alignment, support, and/or transfer of force along selected path(s) and/or with selected interface(s), as will be appreciated by those skilled in the art.

In another aspect, gage part 150 may serve to imitate, replicate, and/or emulate an eventual interface between outer race 114 of bearing 102, and adjustable spacer 110 and retainer 154. Further, gage part 152 may serve to imitate, replicate, and/or emulate an eventual interface between the retainer 154 and medial member 156, as described herein.

Again referring to FIG. 1, gage part 152 may be engaged with gage part 150 to initially cause a positive space or air gap at interface G/1 between the gage part 152 and medial member 156. For example, gage part 150 may be held against outer race 114 of bearing 102 and rotated thereagainst, such as to assure that roller elements 116 are properly aligned and/or not skewed out of position. Next, the gage 150 may be held against the outer race 114 of the bearing 102, and gage part 152 may be adjusted to eliminate the air gap at interface G1. That is, the gage part 152 may be abutted against medial member 156.

Still referring to FIG. 1, adjustable spacer 110 may be placed between gage part 150 and retainer 154. For instance, the adjustable spacer may be inserted into the retainer 154, and then abutted with the gage part 150. The retainer 154 may include leg 160 radially supporting the adjustable spacer, optionally also allowing radial alignment for gage part(s) 150 and/or 152. The retainer 154 with the adjustable spacer received therein, may be pressed toward the gage parts 150 and 152 in order to eliminate an initial gap at interface G2 between the retainer 154 and the gage part 152.

Further referring to FIG. 1, in one aspect, gage part 152 may include an axial dimension sized and/or decreased to accommodate an amount of spring back or resiliency of adjustable spacer 110, following compression thereof between retainer 154 and gage part 150. The axial dimension (e.g., the axial length) of gage part 152 may be further sized with and/or decreased by a selected increment to cause a desired bearing setting. The selected increment may be made greater for a preload or less for an endplay setting, as described herein.

In another aspect, referring again to FIG. 1, retainer 154 may be pressed against gage part 152, and the gage part 152 may interface with gage part 150 and receive axial support from medial member 156, which in turn may be supported axially with retainer 158. For explanatory purposes, those skilled in the art will appreciate the retainer 158 may be considered to have an external axial support to provide a basis for pressing as described herein. An exemplary description of pressing is provided in the above-incorporated U.S. applications Ser. Nos. 09/058,059 and 09/108,514.

Referring still to FIG. 1, the axial dimension of gage part 152 may be selected to provide a desired adjustment for adjustable spacer 110. In particular, retainer 154 may be pressed axially toward gage parts 150 and 152 until the retainer 154 is halted by abutment with the gage part 152. During the pressing of the retainer 154 to abut the gage part 152, the adjustable spacer 110 may be compressed between the retainer 154 and the gage part 150. So, the axial dimension of the gage part 152 may be selected to determine the adjustment provided to the adjustable spacer. In a further aspect, the axial dimension(s) of the gage part(s) 150 and/or 152 may be selected so, following the adjustment to the adjustable spacer, the adjustable spacer itself provides axial support to the retainer, and the adjustable spacer is supported with the gage part 150, such that a gap exists between the gage part 152 and the retainer 154.

The adjustment provided to adjustable spacer 110 may be selected to include a preload for bearing assembly 100. For instance, a compression applied to the adjustable spacer may provide the preload, which will ultimately be applied to bearing 102. Furthermore, the preload may be selected (e.g., reduced from an initial quantity) to provide an endplay setting for the bearing assembly. That is, the adjustment to the adjustable spacer may allow room for a selected play of the bearing 102 and/or bearing 104, where the adjustment ultimately acts through interface of the adjustable spacer with the bearing 102, as described herein.

In yet another aspect, referring to FIG. 1, gages 150 and 152 may cooperate in protecting bearing 102 and/or bearing 104 from the stress of the axial local applied during an adjustment to adjustable spacer 110. In one example, pressing of retainer 154 to adjust (e.g., crush) adjustable spacer 110 may be halted by abutment of the retainer 154 with the gage part 152. Further, the gage part 152 may participate in protecting the bearing 102 and/or the bearing 104 from a path of action of compressive force and/or stress applied to the adjustable spacer. For instance, compressive force may be applied to the adjustable spacer by pressing of the retainer 154 against the adjustable spacer supported with the gage part 150. Further, the gage part 152, in mating with the gage part 150, may support the gage part 150 for application of the compressive force to the adjustable spacer. Moreover, the gage part 152 may receive axial support from medial member 156, which may in turn receive axial support from retainer 158, so the path of action of compressive force may flow around the bearing 102 and/or the bearing 104.

In one example, following adjustment to adjustable spacer 110, retainer 154 may be withdrawn with the adjustable spacer received therein, and gage parts 150 and 152 removed from bearing assembly 100. Next, the retainer 154 containing the spacer, having been adjusted with assistance from the gage parts 150 and 152, may be restored to the bearing assembly. Namely, the adjustable spacer may be received by outer race 114 of bearing 102. Furthermore, the retainer 154 may be received by the outer race 114 of the bearing 102, as well as medial member 156, as can be understood through examination of FIG. 1. In one aspect, axial and radial support may be provided between the retainer 154 and the medial member. In another aspect, axial abutment and/or support may be provided between the outer race 114 and the adjustable spacer, and radial abutment and/or support may be provided between the outer race 114 and the retainer 154.

So, referring to FIG. 1, adjustable spacer 110 may be positioned along with bearing 102 and bearing 104 about shaft 106 and in housing 108, where direct installation of the bearings and the adjustable spacer may occur within a same process of providing adjustment to the adjustable spacer. Therefore, the shaft may comprise a final assembly shaft, the housing may comprise a final assembly housing, retainer 154 may comprise a final assembly retainer, and/or retainer 158 may comprise a final assembly retainer. Through selective formation of and/or positioning for gage part 150 and/or gage part 152, a desired adjustment may be provided to adjustable spacer 110, allowing and/or enabling desired operation and/or performance of bearing(s) 102 and/or 104.

Figure 2:
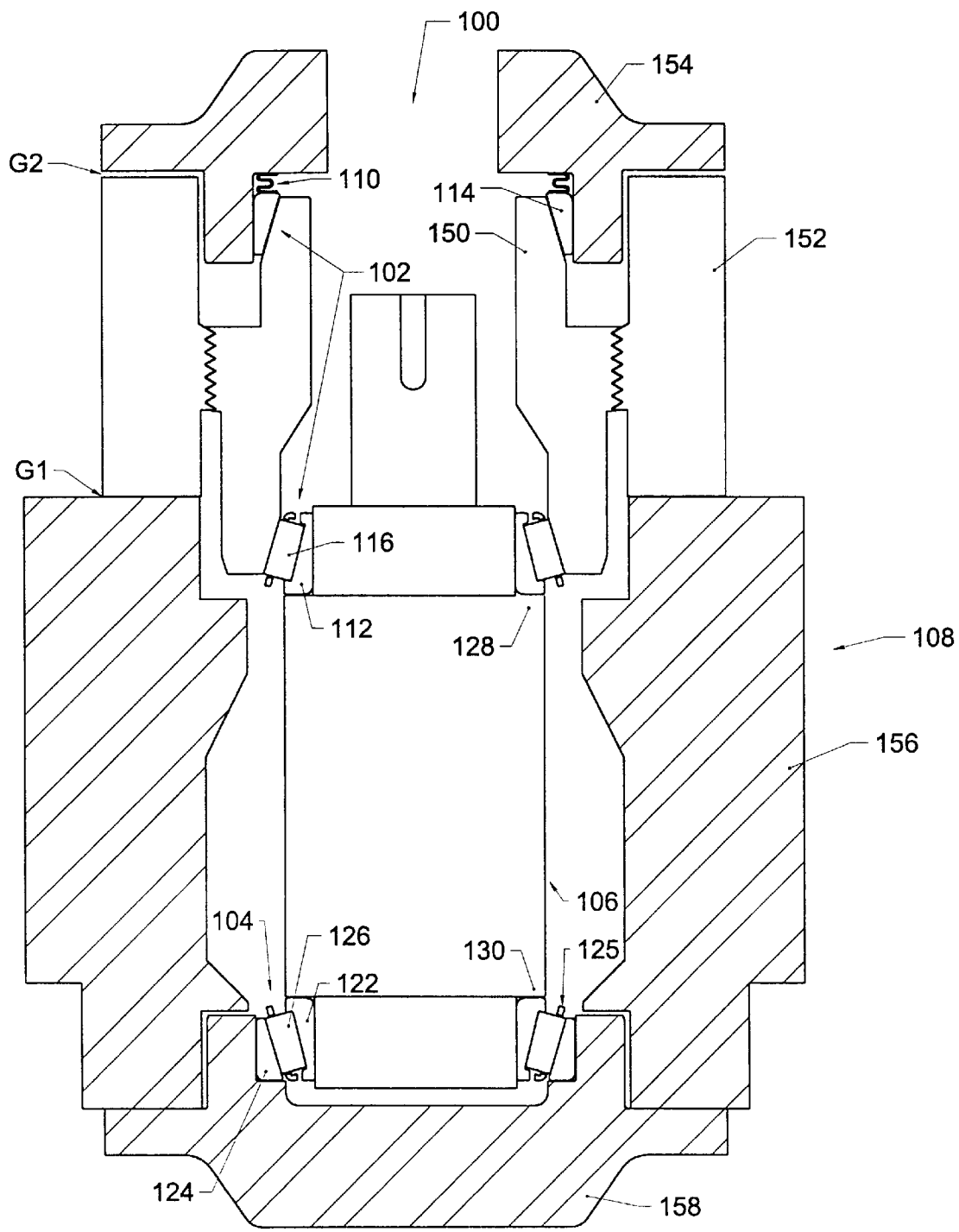
FIG. 2 is a cutaway, sectional, partial, side view of another example of exemplary formation and positioning of an adjustable spacer and gage parts for a bearing assembly located between a shaft and a housing.

Turning now to FIG. 2, in another example, gage part 150 may be located between roller elements 116 of a non-sealed bearing 102, and outer race 114 of the bearing 102. Further, adjustable spacer 110 may be located between the outer race 114 of the bearing 102 and retainer 154. For instance, an adjustment may be provided to the adjustable spacer by compressing the adjustable spacer between the retainer 154 and the outer race 114. In addition, gage parts 150 and 152 may protect the roller elements 116 and inner race 112 of the bearing 102, and/or bearing 104 from a path of action of the compressive force and/or stress. That is, the retainer 154 may be pressed to abut and crush the adjustable spacer, and the adjustable spacer may be supported and crushed with the outer race 114, where the outer race 114 may be supported by the gage part 150 and the gage part 152, which is in turn supported 15 with medial member 156 and retainer 158. No excessive compressive forces are then applied to the bearings when the spacer is adjusted.

In one example, referring further to FIG. 2, retainer 154, following the adjustment to adjustable spacer 110, the adjustable spacer and outer race 114 may be withdrawn so gage parts 150 and 152 may be removed. Next, in a further aspect, the retainer 154, the adjustable spacer, and the outer race 114 may be inserted in bearing assembly 100.

Figure 3:
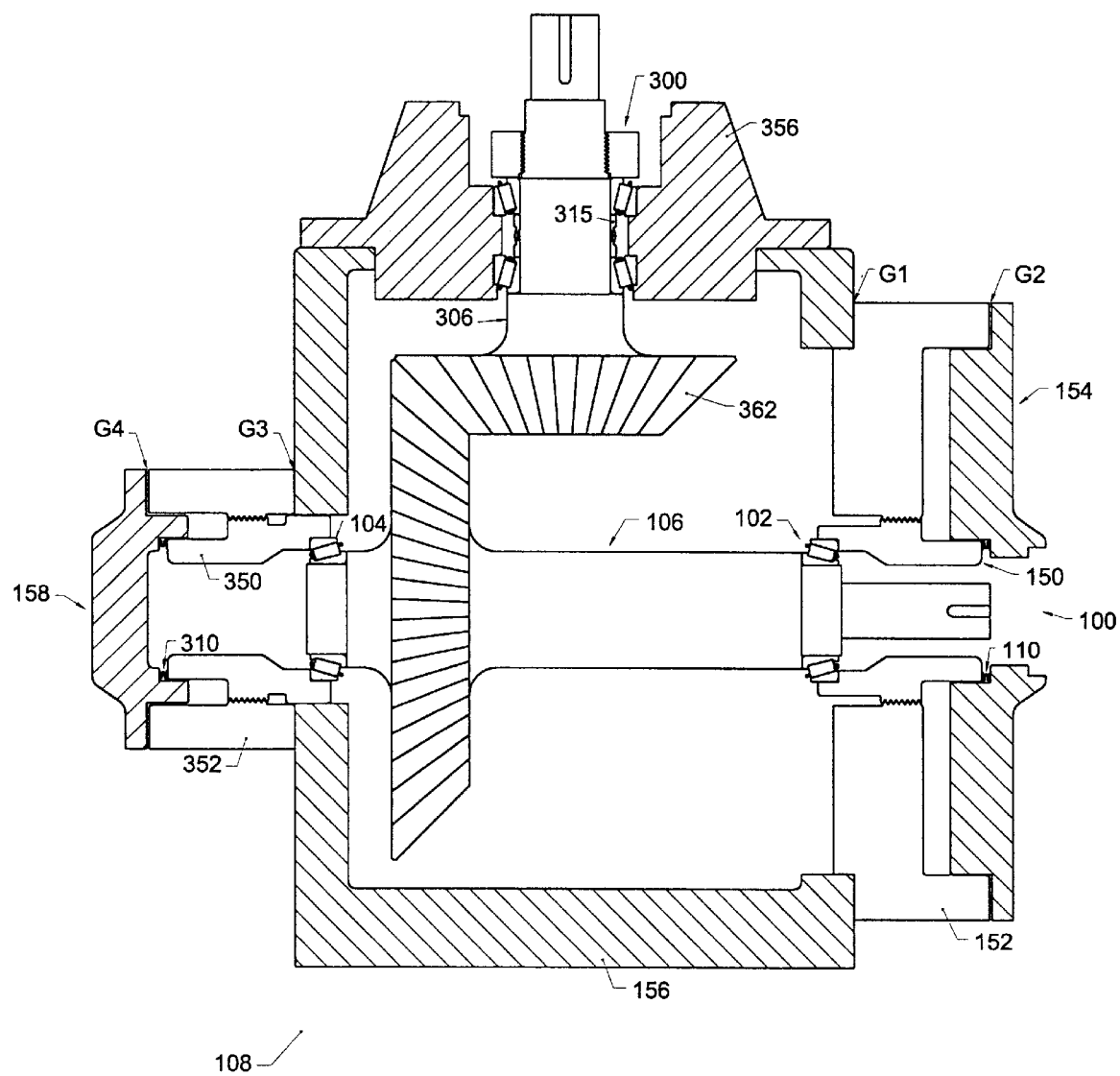
FIG. 3 is a cutaway, sectional, partial, side view of one example of exemplary formation and positioning of multiple adjustable spacers and gage parts for transmission or differential using a bearing assembly located between a shaft and a housing, illustrating a gear mounted on the shaft and meshed with a bevel gear mounted on another shaft.

Now referring to FIG. 3, bearing assembly 100 may include first bearing 102 and second bearing 104 mounted on a spindle comprising shaft 106. Focusing on the bearing 102, its relationship with various components may be considered analogous to that described above with reference to FIG. 1. For instance, spacer 110 may be adjusted between retainer 154 and gage part 150, which may meet with gage part 152 supported by medial member 156. For purposes of illustration, at this point one may consider the medial member 156 to have axial support for an adjustment (e.g., compression and/or crushing) of the adjustable spacer 110. In another embodiment, an arrangement similar to that described above with respect with FIG. 2 may be employed, as will be appreciated by those skilled in the art.

Still referring to FIG. 3, bearing 104 may have relationship(s) comparable to that described herein with reference to bearing 102. In particular, adjustable spacer 310 may have an adjustment (e.g., a preload and/or an endplay setting) applied thereto through pressing of retainer 158 against the spacer 310, axially supported by gage part 350 mated with gage part 352, which in turn receives axial support from medial member 156. Once again, one may consider the medial member 156 to have appropriate axial support, as will be appreciated by those skilled in the art. The gage part 350 may cooperate with the gage part 352 as gage part 150 cooperates with gage part 152, as described herein. Furthermore, interface G3 between the gage part 352 and the medial member 156 may be used similarly to the above-described treatment afforded interface G1 during installation of the bearing(s) 102 and/or 104. Likewise, interface G4 between retainer 158 and gage part 352 may be employed analogously to that described above for interface G2 between retainer 154 and gage part 152.

Again referring to FIG. 3, gage parts 150 and 152 as well as gage parts 350 and 352 may be formed and positioned to provide desired adjustment(s) to adjustable spacer(s) 110 and/or 310 in the direct installation process. In one example, gage part 152 and/or gage part 352 may be formed for attachment to, for instance, air cylinder(s) on a press which may facilitate clamping, such as to the medial member 156, for selective elimination of gap(s) at interface(s) G2 and/or G4, as described herein. An exemplary description of pressing with air cylinders is provided in the above-incorporated U.S. applications Ser. No. 09/058,059 and 09/108,514.

In one aspect, referring still to FIG. 3, shaft 106 may include gear(s) mounted thereon. For instance, such gear(s) may comprise bevel gear 360. The bevel gear 360 may be suited for engagement with another gear, such as bevel gear 362 mounted on shaft 306. In one example, housing 108 may include medial member 356 connected (e.g., fitted) with the medial member 156. Further, relative rotation between the shaft 306 and the medial member 356 may be provided with bearing assembly 300 including adjustable spacer 315. For purposes of illustration, the bearing assembly 300 is depicted as enabling rotation of the shaft 306 within the medial member 356. The bearing assembly 300 and/or the adjustable spacer 315 may include and/or exhibit any properties, characteristics, and/or features of bearing assembly 100 and/or adjustable spacer(s) 110 and/or 310 and/or any bearing assembly and/or adjustable spacer in accordance with the principles of the above-incorporated U.S. Pat. No. 5,549,397 and/or U.S. application(s) Ser. No. 08/661,349, 09/058,059 and/or 09/108,514.

In a further aspect, referring again to FIG. 3, gear 360 may be provided with desired positional relation(s) with gear 362 through use of various gage part(s). For instance, gage part 150 and/or gage part 350 may be operated (e.g., turned) to provide a desired adjustment for the gear 360. For example, the gage part 150 and/or the gage part 350 may be adjustably engaged with the respective gage part 152 and/or gage part 352 in order to obtain a desired mesh between the gear 360 and the gear 362. The desired relational adjustment between the gear 360 and the gear 362 may comprise an engagement, a clearance, and/or a backlash. In one example, a desired relational adjustment may be provided between the gear 360 and the gear 362 by adjusting the gage part 150 and/or the gage part 350, and then a set of hydraulic cylinders might be employed to adjust (e.g., crush) adjustable spacer 110 and/or adjustable spacer 310 through pressing toward one another of retainer 154 and retainer 158.

In another aspect, referring to FIG. 3, following the adjustments for gear 360 and/or adjustable spacers 110 and 310, retainers 154 and 158 and the adjustable spacers 110 and 310 may be withdrawn so gage parts 150, 152, 350 and 352 may be removed. In one example, the retainers and the adjustable spacers 100 and 310 may then be placed in bearing assembly 100.

Figure 4:
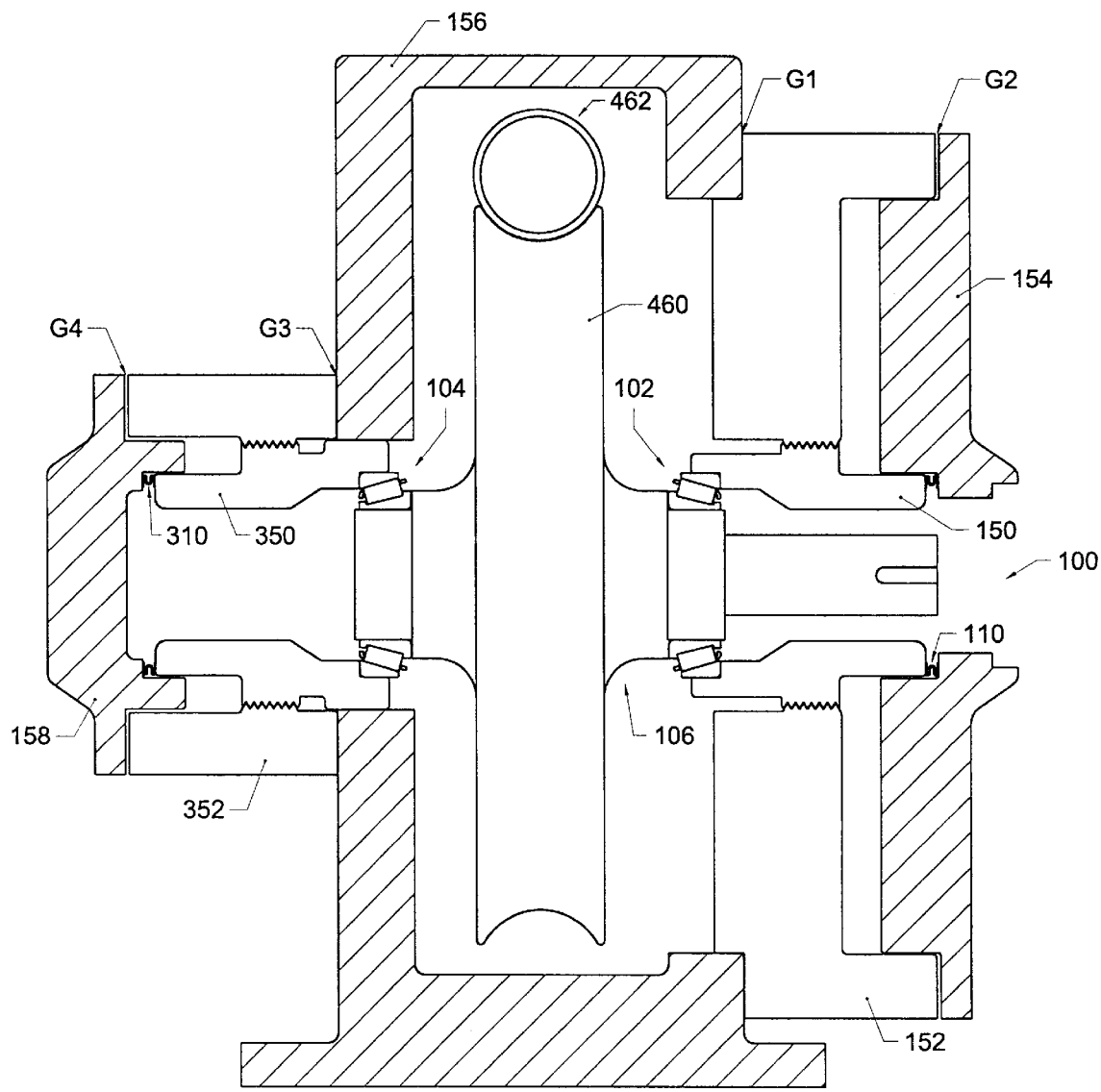
FIG. 4 is a cutaway, sectional, partial, side view of another example of exemplary formation and positioning of multiple adjustable spacers and gage parts for worm gear transmission or differential using a bearing assembly located between a shaft and a housing, illustrating a gear mounted on the shaft and meshed with a worm.

Now referring to FIG. 4, in a still further aspect, bearing assembly 100 may be suited for a worm gear speed reducer set-up, where adjustment to adjustable spacers 110 and 310 for bearings 102 and 104, as well as axial positioning for gearing may be controlled. In particular, gear 460 may be mounted on a spindle comprising shaft 106. Further, the gear 460 may be suited for engagement with worm 462. The position or adjustment for the gear 460 with respect to the worm 462 may include an engagement, a clearance, and/or a backlash.

Still referring to FIG. 4, gear 460 may be moved (e.g., in either direction) axially to obtain a desired relationship with the worm 462. For instance, a desired adjustment may comprise a maximal worm clearance, and may be obtained through observation and/or oscillation of the worm 462. In one example, upon obtaining a desired relation between the gear 460 and the worm 462, gage part(s) 152 and/or 352 may be adjusted to contact the medial member 156. Further, in one aspect, the retainer 154 and the retainer 158 may be pressed toward each other, such as with a press, to adjust spacers 110 and 310, as described herein. In another aspect, the gage parts 150, 152, 350 and 352 may next be removed, with other components for bearing assembly 100 subsequently assembled completely.

As will be appreciated by those skilled in the art, feature (s), component(s), characteristic(s), aspect(s) and/or advantage(s) of bearing assembly 100 and/or bearing assembly 300 and/or gage part(s) 150, 152, 350 and/or 352, as well as adjustable spacer(s) 110, 310 and/or 315, medial member (s) 156 and/or 356, retainer(s) 154 and/or 158, shaft(s) 106 and/or 306, and/or gear(s) 360, 362, 460 and/or 462, described herein in any exemplary embodiment may appropriately be applied and/or extended to any embodiment in accordance with the principles of the present invention.

Operation of the present invention may include periods or intervals of action and inaction, such as an active use followed by idling. Also, the present invention may be employed for varied applications, in various environments. Numerous alternative embodiments of the present invention exist.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. An adjustable bearing adjustment system, comprising:
   a first gage part including first and second gage portions, said first gage portion formed to abut a bearing rotatably connected with a spindle, said second gage portion formed to abut an adjustable spacer located between said second gage portion and a retainer; and
   a second gage part located between said retainer and a housing, said second gage part adjustably engageable with said first gage part, said second gage part configured to provide a selected limit of travel during a compression of said spacer between said second gage portion and said retainer to provide a desired adjustment to said spacer.

2. The system of claim 1, wherein said desired adjustment comprises at least one of a preload and an endplay setting.

3. The system of claim 1, wherein said second gage part includes an axial dimension sized to provide said selected limit of travel.

4. The system of claim 1, wherein said first gage portion abuts said bearing, wherein said second gage portion abuts said spacer, wherein said spacer abuts said retainer, wherein said second gage part is adjustably engaged with said first gage part, and wherein said second gage part abuts said housing.

5. The system of claim 4, wherein said spindle comprises a final assembly spindle.

6. The system of claim 4, wherein said retainer comprises a final assembly retainer.

7. The system of claim 4, wherein said bearing comprises a first bearing and said retainer comprises a first retainer, wherein said housing abuts a second retainer, said second retainer abutting a second bearing rotatably connected with said spindle.

8. The system of claim 1, wherein said spindle comprises at least one of a motor shaft portion, a pump shaft portion, and a speed reducer shaft portion.

9. The system of claim 1, wherein said first and second gage parts include mating screw threads.

10. The system of claim 1, wherein an engagement of said second gage part with said first gage part protects said bearing from a path of action of said compression.

11. The system of claim 1, wherein said bearing comprises a first bearing, wherein said spacer comprises a first spacer, wherein said selected limit of travel comprises a first limit of travel, wherein said compression comprises a first compression and wherein said retainer comprises a first retainer, and further comprising:

a third gage part including third and fourth gage portions, said third gage portion formed to abut a second bearing rotatably connected with said spindle, said fourth gage portion formed to abut a second spacer; and a fourth gage part adjustably engageable with said third gage part, said fourth gage part serving to provide a second limit of travel during a second compression of said second spacer between said fourth gage portion and a second retainer to provide a desired adjustment to said second spacer.

12. The system of claim 11, wherein said first compression and said second compression are substantially concurrent.

13. The system of claim 11, wherein a first gear is mounted on said spindle, and wherein a selected movement of at least one of said first gage part and said third gage part serves to provide a desired relational adjustment between said first gear and a second gear.

14. The system of claim 13, wherein said second gear resembles at least one of a bevel gear and a worm.

15. The system of claim 13, wherein said desired relational adjustment comprises at least one of an engagement, a clearance, and a backlash.

16. The system of claim 11, wherein an engagement of said fourth gage part with said third gage part protects at least one of said first bearing and said second bearing from a path of action of said second compression.

17. An adjustable bearing adjustment system, comprising:

a first gage part including first and second gage portions, said first gage portion formed to abut a first bearing portion of a bearing rotatably connected with a spindle, said second gage portion formed to abut a second bearing portion of said bearing, said second bearing portion located between said second gage portion and a retainer; and a second gage part located between said retainer and a housing, said second gage part adjustably engageable with said first gage part, said second gage part configured to provide a selected limit of travel during a compression of an adjustable spacer between said second bearing portion and said retainer to provide a desired adjustment to said spacer.

18. The system of claim 17, wherein an engagement of said second gage part with said first gage part protects said first bearing portion from a path of action of said compression.

19. An adjustable bearing adjustment method, comprising:

locating a first gage part between a bearing portion and an adjustable spacer, said adjustable spacer located between said first gage part and a retainer, said bearing portion rotatably connected with a spindle;

adjustably engaging a second gage part with said first gage part said second gage part located between said retainer and a housing; and employing said second gage part to provide a selected limit of travel during a compression of said spacer between said first gage part and said retainer to provide a desired adjustment to said spacer.

20. The method of claim 19, further comprising employing an engagement of said second gage part with said first gage part to protect said bearing portion from a path of action of said compression.

21. The method of claim 19, wherein said bearing portion comprises a first bearing portion of a bearing, wherein a second bearing portion of said bearing is located between said first gage part and said spacer, and wherein said compression is applied to said spacer between said second bearing portion and said retainer to provide said desired adjustment.

22. The method of claim 19, wherein a first gear is mounted on said spindle, and further comprising moving said first gage part to provide a desired relational adjustment between said first gear and a second gear.

* * * * *